Patented Sept. 16, 1941

2,255,934

UNITED STATES PATENT OFFICE 2,255,934

CARRIER-CURRENT PROTECTIVE RELAYING SYSTEM

Bernard E. Lenehan, Bloomfield, and Shirley L. Goldsborough, Basking Ridge, N. J., assignors to Westinghouse Electric & Manufacturing Company, East Pittsburgh, Pa., a corporation of Pennsylvania Application April 29, 1939, Serial No. 270,822

7 Claims. (Cl. 175—294)

Our invention relates to relaying equipment for a transmission-line having a superimposed protective carrier-current system or other signal-current pilot-channel between the ends of a line-section to be protected, and it has particular reference to novel control-means for the signal-current transmitter of such a system.

More particularly, our invention has, for an object, the provision of a cathode-current carrier-control circuit which has certain advantages, as will subsequently be pointed out.

Figure 1:
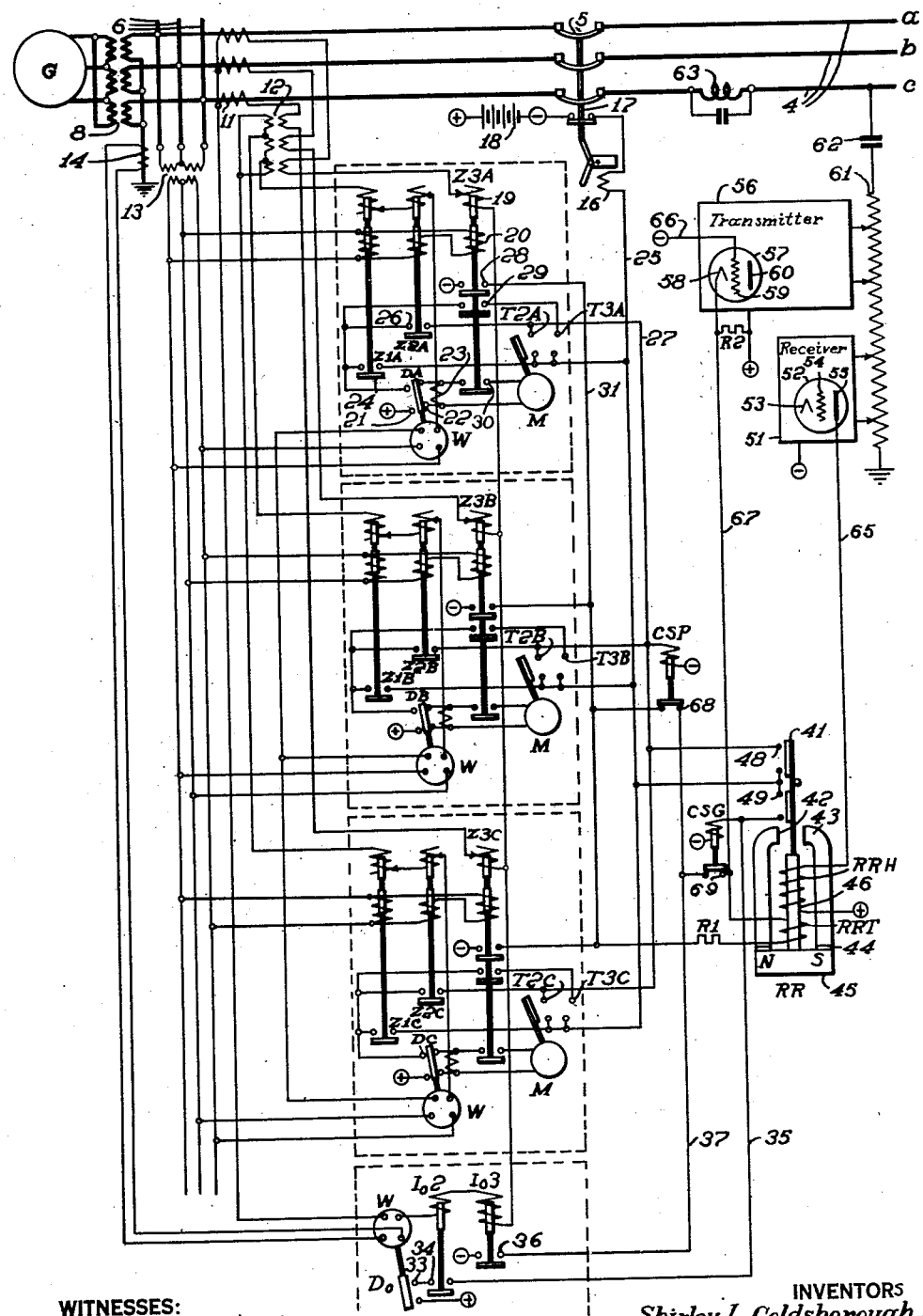
Figure 2:
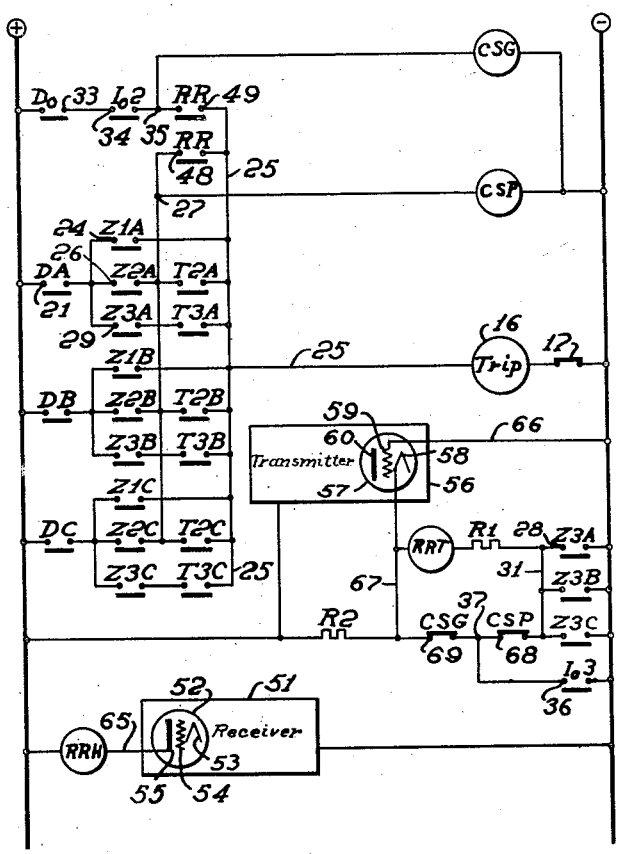

With the foregoing and other objects in view, our invention consists in the circuits, systems, combinations, apparatus and methods hereinafter described and claimed, and illustrated in the accompanying drawings, wherein:

Figure 1 is a simplified diagrammatic view of circuits and apparatus illustrating our invention in a preferred form of embodiment, with the electromagnetic relays illustrated in their deenergized positions, features which are unnecessary to an understanding of our invention being omitted for the sake of clearness; and Fig. 2 is a so-called "across-the-line" diagram of the direct-current connections of said relaying system.

In Fig. 1, we illustrate our invention as being applied to the protection of one end of a three-phase transmission line-section 4, the three phase-conductors being distinguished by the letters $a$, $b$ and $c$. The line-section 4 is connected through a circuit breaker 5, to a bus 6, which is energized, through delta-star step-up transformers 8, from a generator or generators G. Energy for the various relaying apparatus is obtained by means of a bank of line-current transformers 11 which produce the relaying currents $I_A$, $I_B$ and $I_C$, corresponding to the three line-phases; a bank of auxiliary current-transformers 12 which produce the relaying currents $(I_A-I_B)$, $(I_B-I_C)$ and $(I_C-I_A)$; a bank of potential transformers 13 for supplying the relaying voltages; and an auxiliary current-transformer 14 connected in the grounded neutral of the line-connected star-side of the power-transformers 8 for obtaining a convenient source of reference-current for determining the direction of the residual line-currents, as will be subsequently described.

The circuit breaker 5 is provided with a trip coil 16 which is energized, in accordance with our protective relaying means, through an auxiliary circuit-breaker contact 17, and a direct-current source symbolized by a battery 18, the terminals of which are indicated by (+) and (—).

Our invention is illustrated as being applied to a relaying system utilizing three phase-fault relays in each phase, said relays being of increasing sensitivities corresponding to what is known as "first-zone," "second-zone," and "third-zone" operation, the different zones being indicated by the numerals 1, 2 and 3, and the different phases being distinguished by the letters A, B and C, so that the nine quick-acting non-directional impedance relays are designated Z1A, Z2A, Z3A, Z1B, Z2B, Z3B, Z1C, Z2C and Z3C. Each impedance-relay element consists of a current-responsive operating coil 19 and a voltage-responsive restraining coil 20, suitably energized, in any desired manner, so as to be responsive to the line-impedance. The particular manner of energization, illustrated in the drawings, is that which is shown in a Harder Patent No. 2,144,494, granted January 17, 1939, and assigned to the Westinghouse Electric & Manufacturing Company. As shown, the current-coils of the first-zone and second-zone impedance-relay elements Z1A—Z2A, Z1B—Z2B and Z1C—Z2C are energized with the currents $(I_A-I_B)$, $(I_B-I_C)$ and $(I_C-I_A)$, respectively, from the auxiliary current-transformers 12, while the current-coils of the third-zone impedance-relay elements Z3A, Z3B and Z3C are energized with the currents $I_A$, $I_B$ and $I_C$, respectively, from the line-current transformers 11. The voltage-coils of the first-zone impedance-relay elements Z1A, Z1B and Z1C are illustrated as being connected across the corresponding secondary voltages $(V_A-V_B)$, $(V_B-V_C)$ and $(V_C-V_A)$, respectively, of the potential transformers 13, while the voltage-coils of the second-zone and third-zone impedance-relay elements, in the respective phases, as Z2A and Z3A, Z2B and Z3B, and Z2C and Z3C, are connected in series with each other and across the beforementioned secondary voltages $(V_A-V_B)$, $(V_B-V_C)$ and $(V_C-V_A)$, respectively. We wish it to be understood, however, that any desired phase-current line-impedance response may be utilized.

A group of three impedance relays for each of the line-phases is associated with a quick-acting directional relay element which is indicated schematically in the drawings as a simple wattmeter element W. Each directional element W is provided with a make-contact 21 and a break-contact 22, the make-contacts for the different phases being utilized as the directional relay elements DA, DB and DC, respectively. The wattmetric directional elements DA, DB and DC have current-coil circuits which, in the illustrated system, are connected in series with the current-coils of the corresponding first-zone and second-zone impedance-relay elements Z1A—Z2A, Z1B—Z2B and Z1C—Z2C, respectively, and voltage-coil circuits which are illustrated as being energized from the secondary voltages ($V_C—V_A$), ($V_A—V_B$) and ($V_B—V_C$), respectively.

Each group of phase-fault relays is provided with a timing motor M, which may be of the resetting type shown in the Goldsborough Patent No. 1,934,665, granted November 7, 1933, and assigned to the Westinghouse Electric & Manufacturing Company. The timing motors M have second-zone and third-zone timer contacts T2A, T3A, T2B, T3B, T2C, T3C. The timer motors M are illustrated as being energized by auxiliary current-transformers 23, from the currents ($I_A—I_B$), ($I_B—I_C$) and ($I_C—I_A$), respectively. The current-transformers 23 are normally short-circuited, respectively, by the back contacts 22 of the respective directional elements W. The second-zone timer-contacts T2A, T2B and T2C are designed to provide a time-delay which is sufficient, in general, for the completion of a circuit-interrupting operation by a first-zone relaying means at a point closer to the fault, and the third-zone timer contacts T3A, T3B and T3C are arranged to provide a time-delay which is sufficient, in general, for the completion of a circuit-interrupting operation by a second-zone relaying-means at a point closer to the fault.

The first-zone impedance elements Z1A, Z1B and Z1C are each provided with a make-contact 24 which is connected in series with the make-contact 21 of the corresponding directional elements DA, DB and DC, respectively, to energize a tripping circuit 25, as indicated on the drawings.

The second-zone impedance elements Z2A, Z2B and Z2C are each provided with a make-contact 26 which is connected in series with the make-contact 21 of the corresponding directional element DA, DB or DC, respectively, and also in series with the corresponding second-zone timer-contact T2A, T2B or T2C, respectively, to energize the tripping circuit 25 from the positive bus (+), as shown in the drawings. The directional elements and the second-zone impedance-relay elements in the respective phases, as DA—Z2A, DB—Z2B and DC—Z2C, have their serially connected contacts 21 and 26 connected, in three parallel circuits, between the positive bus (+) and an auxiliary relaying bus or circuit 27, which will be referred to hereinafter.

The third-zone impedance elements Z3A, Z3B and Z3C are each provided with three make-contacts 28, 29 and 30. The three make-contacts 28 are connected in parallel with each other, to connect an auxiliary relay circuit 31 to the negative battery-terminal (—). The respective make-contacts 29 are each connected in series with the corresponding make-contact 21 of its associated directional element DA, DB or DC, respectively, and also in series with the corresponding third-zone timer-contacts T3A, T3B or T3C, respectively, to energize the tripping bus 25. The respective make-contacts 30 are connected in series with the energizing windings of the timer motors M for the respective phases, to energize the same from the respective auxiliary current-transformers 23, provided that the corresponding directional element DA, DB or DC has responded so as to open its back-contact 22.

In the illustrated system embodying our invention, we also provide a ground-protection panel comprising a wattmetric ground directional element D0 having a make-contact 33, and two overcurrent ground relays $I_o2$ and $I_o3$ having sensitivities corresponding to the second and third-zone impedance elements, respectively. The less sensitive ground overcurrent relay $I_o2$ is provided with a make-contact 34 which is connected in series with the make-contact 33 of the ground directional element D0, to energize an auxiliary relaying bus or circuit 35. The sensitive ground overcurrent relay $I_o3$ is provided with a make-contact 36 which serves to connect an auxiliary relaying circuit 37 to the negative battery-terminal (—). The two ground over-current relays $I_o2$ and $I_o3$, and the directional terminals of the ground directional relay D0 are energized from the neutral current ($I_A+I_B+I_C$), of the star-connected line-current transformers 11, while the polarizing terminals of the ground directional relay D0 are energized from the auxiliary current-transformer 14, so as to respond to the current in the grounded neutral circuit of the power transformers 8.

Our invention relates to carrier-current or equivalent protective relaying systems, and to this end our protective system is provided with carrier-current equipment at each end of the protected line-section. As the equipments at the two ends are identical, a description of one will suffice for both, as will be readily understood.

We necessarily utilize a carrier-current receiver-relay RR. While we are not limited to any particular kind of receiver-relay, we prefer to utilize, and have illustrated, an improved form of relay which is described and claimed in a Lenehan and Rogers Patent 2,144,498, granted January 17, 1939, and assigned to the Westinghouse Electric & Manufacturing Company. Some of the more essential features of the receiver-relay RR are indicated in Fig. 1, wherein the relay is illustrated as comprising a movable element 41, two stationary pole-pieces 42 and 43 which are connected, through brass or other non-magnetic separators 44, to the ends of a polarizing member or permanent magnet 45. The movable member 41 is mounted on the end of a central magnetizable core 46 which abuts against the midpoint of the permanent magnet 45, and which carries a tripping or actuating winding RRT and a holding or restraining winding RRH, the latter being the stronger. The movable member 41 cooperates with two make-contacts 48 and 49.

We also utilize a carrier-current receiver 51 which is provided with one or more receiver-tubes 52 having a cathode 53, a grid 54 and a plate 55. We further provide a carrier-current transmitter 56 which includes a tube-oscillator 57, or other carrier-current generator, the tube-oscillator being illustrated as comprising a cathode 58, a grid 59 and a plate 60. The transmitter 56 and the receiver 51 are connected to a coupling transformer 61 which is illustrated as being connected, through a coupling capacitor 62, between the phase-C line-conductor and ground. The carrier currents are confined more or less to the protected line-section by means of a resonant carrier-frequency choke coil or wave-trap 63 in the phase C conductor, in a manner readily understood. The receiver-tube 52 is provided with a plate-circuit 65 which is energized from the D. C. terminals (+) and (—). The tube oscillator 57 of the transmitter 56 is illustrated as being provided with a grid-circuit 66 which is connected to the negative battery-terminal (—), it being noted that the battery 18 serves both as a tripping source and as a plate-voltage source of supply for the transmitter and receiver-tubes. The tube-oscillator 57 is also provided with a cathode-circuit 67.

In addition to the foregoing equipment, we also utilize two auxiliary relays or contactor-switches CSP and CSG for providing a directional second-zone response to phase-faults and ground-faults respectively, the operating coils of these relays being connected, respectively, between the negative bus (—) and the respective auxiliary relaying buses 27 and 35. The auxiliary relays CSP and CSG are each provided with a single break-contact 68 and 69, respectively.

The carrier-current equipment is connected as follows.

The transmitter 56 is normally in a non-transmitting condition, this condition being brought about by the fact that the cathode-circuit 67 of the transmitter is disconnected from the negative terminal (—) of the plate-voltage source of supply therefor. The transmitter cathode-circuit 67 is normally connected to the auxiliary relaying bus 31, through the two back-contacts 69 and 68 of the auxiliary relays CSG and CSP, respectively, and the auxiliary relaying bus 31 is normally disconnected from the negative battery-terminal (—) by reason of the normally open condition of the three parallel-connected make-contacts 28 of the third-zone impedance elements Z3A, Z3B and Z3C. These three parallel-connected make-contacts 28 of the third-zone impedance elements, and the back-contact 68 of the directional phase-fault-responsive CSP relay are by-passed by the normally open make-contact 36 of the third-zone ground overcurrent element $I_o3$.

We thus provide what is known as preferential-fault relaying, in giving preference to ground-fault control, so that the ground-fault-responsive relay-contacts 36 and 69 can maintain absolute control over the starting and stopping of the carrier-current transmission, regardless of whether the phase-fault-responsive relays are actuated or not.

The receiver-relay trip-coil RRT is connected in shunt around the two serially connected back-contacts 68 and 69 of the CSP and CSG relays. In the particular embodiment of the invention illustrated in the drawings, the RRT coil is connected in series with a resistor R1 and in shunt with the two back-contacts 68 and 69. The RRT coil is thus normally short-circuited by the back-contacts 68 and 69 of the CSP and CSG relays. In order to permit the RRT coil to receive current when either one of the CSP or CSG relays responds, the transmitter cathode-circuit 67 is connected to the positive bus (+) through a resistor R2, in accordance with the illustrated embodiment of our invention.

The receiver-relay holding-coil RRH is connected in the plate-circuit 65 of the receiver 51.

The receiver-relay make-contact 48 is connected between the auxiliary relaying circuit 27 and the tripping circuit 25; and the receiver relay make-contact 49 is connected between the auxiliary relaying circuit 35 and the tripping circuit 25.

The tripping circuit 25 is utilized to energize the trip coil 16 of the circuit breaker 5, the trip coil 16 being connected between the tripping circuit 25 and the negative bus (—) through the auxiliary contact 17 of the circuit breaker, in a well-known manner.

In operation, our illustrated system operates as follows:

During normal fault-free operating-conditions of the transmission line, the carrier-current transmitters 56 at both ends of the protected line-section 4 are in a non-transmitting condition, and the receiver-relays RR are in a non-actuated condition, being so biased as to normally keep their make-contacts 48 and 49 open. The directional phase-fault and ground-fault auxiliary relays CSP and CSG are also normally in a non-actuated condition, so as to keep their respective back-contacts 68 and 69 closed, because of the absence of fault-current conditions on the transmission line. The two coils RRT and RRH of each of the receiver relays RR are thus normally deenergized.

In the event of the occurrence of either a phase-fault or a ground-fault of a severity sufficient to actuate any one of the non-directional third-zone fault-responsive elements Z3A, Z3B, Z3C, or $I_o3$, the transmitter cathode-circuit 67 is instantly connected to the negative battery-terminal (—), thus instantly initiating carrier-current transmission, and energizing the receivers 51 at both ends of the protected line-section 4, this operation normally occurring within well under one cycle, on a 60-cycle system. If the fault is of an intensity sufficient to actuate the corresponding non-directional second-zone fault-responsive elements Z2A, Z2B, Z2C or $I_o2$, and if, at the same time, the current-direction is such as to indicate that the fault is on the protected-line-section side of the relaying point, so that the corresponding directional element DA, DB, DC or $D_o$ is actuated, the corresponding phase-fault-responsive or ground-fault-responsive contactor-switch CSP or CSG will be actuated, opening their contacts 68 or 69, respectively.

It will be noted that the connections are such that the actuation of the directional phase-fault relay CSP will have no effect upon the carrier-current transmission, in the event that the carrier-current transmission has been initiated by the response of the sensitive ground-fault detector $I_o3$. If the make-contact 36 of this sensitive ground-fault protector $I_o3$ is open, then a response of the CSP relay will disconnect the transmitter cathode-circuit 67 from the negative bus (—) at the back-contacts 68 of the CSP relay. If the directional ground-fault relay CSG is actuated, it will operate, regardless of anything else to disconnect the transmitter cathode-circuit 67 from the negative bus (—) at the back-contact 69 of the CSG relay. When the transmitter cathode-circuit 67 is disconnected from the negative bus, by reason of the operation of either one of the auxiliary relays CSP or CSG, the transmission of carrier by that transmitter is immediately stopped, and if the carrier-current transmission at both ends of the protected line-section 4 is discontinued, the receivers 51 at both ends will become deenergized.

The receiver-relays RR at the respective ends of the protected line-section 4 are controlled simultaneously with the carrier-current transmitters 56. As soon as either carrier-current transmitter is energized, both receivers 51 are energized, so as to instantly energize the holding-coils RRH of the receiver-relay RR at both ends of the protected line-section. When either one of the directional second-zone phase-fault relays CSP or CSG is actuated, a short-circuit is removed from around the receiver-relay tripping coil RRT, so this coil is energized, but since this coil is weaker than the holding coil RRH, it will not result in an actuation of the receiver-relay RR until the holding coil RRH has become deenergized as a result of the discontinuance of carrier-current transmission at both ends of the protected line-section.

As soon as the receiver-relay holding-coil RRH becomes deenergized, the receiver-relay trip-coil RRT actuates the receiver-relay RR to close both of its make-contacts 48 and 49. The receiver-relay make-contact 48 is connected in series with the directional second-zone phase-fault-responsive bus 27 so as to instantaneously energize the tripping circuits 25 at both ends of the protected line-section, because the second-zone impedance-elements Z2A, Z2B and Z2C respond to faults located at a distance further than the length of the protected line-section 4. The receiver-relay make-contact 49 is connected in series with the directional second-zone ground-fault-responsive bus 35, to correspondingly energize the tripping bus 26. It will be noted that instantaneous tripping, independent of the carrier-current response, is obtained for first-zone phase-faults within the protected line-section, by reasons of the closure of the contacts 21 and 24. The receiver-relay contacts 48 and 49 are utilized to give carrier-supervised tripping in response to second-zone faults accompanied by the proper direction of the line-current. In addition to the foregoing, the usual time-delay protection for second-zone and third-zone faults is provided, independently of the carrier-current response, through the second-zone and third-zone timer-contacts T2 and T3 respectively.

An advantage of our invention is that carrier-current transmission is controlled by make-contacts of the sensitive, or third-zone, non-directional fault-responsive elements Z3A, Z3B, Z3C and I$_o$3, respectively, instead of by break-contacts as in previous carrier-current systems, such, for example, as the system shown in Fig. 3 of the Lenehan Patent 2,144,499, granted January 17, 1939, and assigned to the Westinghouse Electric & Manufacturing Company. It has been found that this utilization of fault-responsive make-contacts is more desirable than fault-responsive break-contacts, because the latter are more susceptible of momentary chattering, due to mild line-disturbances which are insufficient to fully actuate the respective sensitive fault-responsive relays.

It will further be observed that our utilization of the transmitter-controlling contacts in series with the transmitter cathode-circuit 67, to interrupt the carrier-current transmission, at either the CSP relay-contact 68 or the CSG relay-contact 69, is particularly advantageous in a system utilizing a transmitter oscillator-tube 57 which has its grid 59 connected to the negative bus (—), as illustrated on our drawings, because, when either one of the relay-contacts 68 or 69 opens, so as to interrupt the carrier-current transmission, the main supply-current of the carrier-current transmitter passes through this open relay-contact 68 or 69 and produces an arc which has a certain voltage-drop of, say, 12 volts. By reason of the negative connection of the transmitter grid 59, this 12-volt arc-drop in the transmitter cathode-circuit produces a negative 12-volt bias on the grid, thus reducing the plate-current which flows through the cathode-circuit, and automatically reducing the burden on the arcing contact 68 or 69, as the case may be, so as to facilitate the circuit-opening operation. It thus appears that the relay-contact burden entailed by attempting to control the heavy-current cathode-circuit 67, rather than the negligible-current grid-circuit 66 of the transmitter, is not nearly so great as it would be without the negative biasing effect of the arc-drop in the switching contacts.

While we have illustrated our invention in a single preferred form of embodiment, it will be obvious that many changes, such as those which have been suggested during the course of the description, and other changes not alluded to, may be made by those skilled in the art, without departing from the essential features of our invention. We desire, therefore, that the appended claims shall be accorded the broadest construction consistent with their language and the prior art.

We claim as our invention:

1. Relaying equipment for a transmission-line, including a signal-current pilot-channel between the ends of a line-section to be protected, and further including, at each of said ends, a quick-acting directional fault-responsive relaying-means for promptly effecting certain predetermined responses, including a circuit-closing operation and a circuit-opening operation, in response to the occurrence of a predetermined severity of fault-indicative line-conditions accompanied by a current-direction indicative that the fault is on the protected-line-section side of the relaying point, a quick-acting sensitive non-directional fault-responsive relaying-means for promptly effecting a circuit-closing operation, said sensitive non-directional fault-responsive relaying-means being sensitive to respond to less severe fault-indicative line-conditions than said directional fault-responsive relaying-means, a normally non-transmitting signal-current transmitter associated with said pilot-channel and including a normally open transmitter-controlling circuit, a signal-current receiver-relay associated with said pilot-channel and including a circuit-make-and-break member, means for maintaining the receiver-relay in an open-circuit condition during normal fault-free line-operating conditions, means for effecting a line-sectionalizing operation in response to said directionally responsive circuit-closing operation and a closed-circuit condition of said receiver-relay, means for causing said transmitter-controlling circuit to be closed in response to said non-directionally responsive circuit-closing operation and to be opened in response to said directionally responsive circuit-opening operation, means responsive to the receipt of a predetermined signal-current by said receiver-relay for blocking the change of said receiver-relay to its closed-circuit condition, and means responsive to a response of said directional relaying-means for causing the receiver-relay to change to its closed-circuit condition in the absence of said blocking action.

2. Preferential relaying equipment for an alternating current transmission-line, including a signal-current pilot-channel between the ends of a line-section to be protected, and further including, at each of said ends, two different kinds of quick-acting directional fault-responsive relaying-means for promptly effecting certain predetermined responses, including, in each case, a circuit-closing operation and a circuit-opening operation, in response to the occurrence of a predetermined severity of line-conditions indicative, respectively, of a preferential type of fault and a non-preferential type of fault, said fault-indicative line-conditions being accompanied, in each case, by a current-direction indicative that the fault is on the protected-line-section side of the relaying point, a preferential, and a non-preferential, quick-acting sensitive non-directional fault-responsive relaying-means for promptly effecting a circuit-closing operation, in each case, said sensitive non-directional fault-responsive relaying-means being sensitive to respond to less severe fault-indicative line-conditions than the respective directional fault-responsive relaying-means, a normally non-transmitting signal-current transmitter associated with said pilot-channel and including a normally open transmitter-controlling circuit, a signal-current receiver-relay associated with said pilot-channel and including a circuit-make-and-break member, means for maintaining the receiver-relay in an open-circuit condition during normal fault-free line-operating conditions, means for effecting a line sectionalizing operation in response to either one of said directionally responsive circuit-closing operations and a closed-circuit condition of said receiver-relay, means for causing said transmitter-controlling circuit to be closed in response to said non-preferential non-directionally responsive circuit-closing operation accompanied by a non-response of both of said directional relaying-means, means for causing said transmitter-controlling circuit to be closed in response to said preferential non-directionally responsive circuit-closing operation accompanied by a non-response of said preferential directional relaying-means regardless of the condition of said non-preferential relaying-means, said transmitter-controlling means including circuit-means responsive to the respective directionally responsive circuit-opening operations, means responsive to the receipt of a predetermined signal-current by said receiver-relay for blocking the change of said receiver-relay to its closed-circuit condition, and means responsive to a response of said either one of said directional relaying-means for causing the receiver-relay to change to its closed-circuit conditions in the absence of said blocking action.

3. Relaying equipment for a transmission-line, including a signal-current pilot-channel between the ends of a line-section to be protected, and further including, at each of said ends, a quick-acting directional fault-responsive relaying-means for promptly effecting certain predetermined responses, including the actuations of a normally open circuit-make-and-break means and a normally closed circuit-make-and-break member, respectively, in response to the occurrence of a predetermined severity of fault-indicative line-conditions accompanied by a current-direction indicative that the fault is on the protected-line-section side of the relaying point, a quick-acting sensitive non-directional fault-responsive relaying-means for promptly actuating a normally open circuit-make-and-break member, said sensitive non-directional fault-responsive relaying-means being sensitive to respond to less severe fault-indicative line-conditions than said directional fault-responsive relaying-means, a normally non-transmitting signal-current transmitter associated with said pilot-channel and including a tube-oscillator having a cathode, a plate-voltage source of supply for said tube-oscillator, a signal-current receiver-relay associated with said pilot-channel and including a circuit-make-and-break member, means for maintaining the receiver-relay in an open-circuit condition during normal fault-free line-operating conditions, means for effecting a line-sectionalizing operation in response to an actuation of said normally open, directionally responsive, circuit-make-and-break means and a closed-circuit condition of said receiver-relay, means for causing said cathode to be connected to the negative terminal of said plate-voltage source in response to an actuation of said normally open, non-directionally responsive, circuit-make-and-break member and for causing it to be disconnected therefrom in response to an actuation of said normally closed, directionally responsive, circuit-make-and-break member, a resistor connected between said cathode and the positive terminal of the plate-voltage source, means responsive to the receipt of a predetermined signal-current by said receiver-relay for blocking the change of said receiver-relay to its closed-circuit condition, and means connected in shunt to said normally closed, directionally responsive, circuit make-and-break member for causing the receiver-relay to change to its closed-circuit condition in the absence of said blocking action.

4. Preferential relaying equipment for an alternating-current transmission-line, including a signal-current pilot-channel between the ends of a line-section to be protected, and further including, at each of said ends, two different kinds of quick-acting directional fault-responsive relaying-means for promptly effecting certain predetermined responses, including, in each case, the actuations of a normally open circuit-make-and-break means and a normally closed circuit-make-and-break member, respectively, in response to the occurrence of a predetermined severity of line-conditions indicative, respectively, of a preferential type of fault and a non-preferential type of fault, said fault-indicative line-conditions being accompanied, in each case, by a current-direction indicative that the fault is on the protected-line-section side of the relaying point, a preferential, and a non-preferential, quick-acting sensitive non-directional fault-responsive relaying-means for promptly actuating a normally open circuit-make-and-break member, in each case, said sensitive non-directional fault-responsive relaying-means being sensitive to respond to less severe fault-indicative line-conditions than the respective directional fault-responsive relaying means, a normally non-transmitting signal-current transmitter associated with said pilot-channel and including a tube-oscillator having a cathode, a plate-voltage source of supply for said tube-oscillator, a signal-current receiver-relay associated with said pilot-channel and including a circuit-make-and-break member, means for maintaining the receiver-relay in an open-circuit condition during normal fault-free line-operating conditions, means for effecting a line-sectionalizing operation in response to an actuation of either one of said normally open, directionally responsive, circuit-make-and-break means and a closed-circuit condition of said receiver-relay, a cathode-circuit between said cathode and the negative terminal of said plate-voltage source, said cathode-circuit including, in series-circuit relation, said preferential, normally closed, directionally responsive, circuit-make-and-break member, said non-preferential, normally closed, directionally responsive, circuit-make-and-break member, and said non-preferential, normally open, non-directionally responsive, circuit-make-and-break member, with said two last-mentioned members shunted by said preferential, normally open, non-directionally responsive, circuit-make-and-break member, a resistor connected between said cathode and the positive terminal of the plate-voltage source, means responsive to the receipt of a predetermined signal-current by said receiver-relay for blocking the change of said receiver-relay to its closed-circuit condition, and means connected in shunt around both of said normally closed, directionally responsive, circuit-make-and-break members for causing the receiver-relay to change to its closed-circuit condition in the absence of said blocking action.

5. Relaying equipment for a transmission-line, including a signal-current pilot-channel between the ends of a line-section to be protected, and further including, at each of said ends, a quick-acting directional fault-responsive relaying-means for promptly effecting certain predetermined responses, including a circuit-closing operation and a circuit-opening operation, in response to the occurrence of a predetermined severity of fault-indicative line-conditions accompanied by a current-direction indicative that the fault is on the protected-line-section side of the relaying point, a quick-acting sensitive non-directional fault-responsive relaying-means for promptly effecting a circuit-closing operation, said sensitive non-directional fault-responsive relaying-means being sensitive to respond to less severe fault-indicative line-conditions than said directional fault-responsive relaying-means, a normally non-transmitting signal-current transmitter associated with said pilot-channel and including a tube-oscillator having a cathode and a grid, a plate-voltage source of supply for said tube-oscillator, a signal-current receiver-relay associated with said pilot-channel and including a circuit-make-and-break member, means for maintaining the receiver-relay in an open-circuit condition during normal fault-free line-operating conditions, means for effecting a line-sectionalizing operation in response to said directionally responsive circuit-closing operation and a closed-circuit condition of said receiver-relay, means for causing said cathode to be connected to the negative terminal of said plate-voltage source in response to said non-directionally responsive circuit-closing operation and for causing it to be disconnected therefrom in response to said directionally responsive circuit-opening operation, means for directly connecting said grid to the negative terminal of said plate-voltage source, means responsive to the receipt of a predetermined signal-current by said receiver-relay for blocking the change of said receiver-relay to its closed-circuit condition, and means responsive to a response of said directional relaying-means for causing the receiver-relay to change to its closed-circuit condition in the absence of said blocking action.

6. Relaying equipment for a transmission-line, including a signal-current pilot-channel between the ends of a line-section to be protected, and further including, at each of said ends, a quick-acting directional fault-responsive relaying-means for promptly effecting certain predetermined responses, including a circuit-closing operation and a circuit-opening operation including the actuation of a moving-contact circuit-make-and-break member, in response to the occurrence of a predetermined severity of fault-indicative line-conditions accompanied by a current-direction indicative that the fault is on the protected-line-section side of the relaying point, a quick-acting sensitive non-directional fault-responsive relaying-means for promptly effecting a predetermined response, said sensitive non-directional fault-responsive relaying-means being sensitive to respond to less severe fault-indicative line-conditions than said directional fault-responsive relaying-means, a normally non-transmitting signal-current transmitter associated with said pilot-channel and including a tube-oscillator having a cathode and a grid, a plate-voltage source of supply for said tube-oscillator, a signal-current receiver-relay associated with said pilot-channel and including a circuit-make-and-break member, means for maintaining the receiver-relay in an open-circuit condition during normal fault-free line-operating conditions, means for effecting a line-sectionalizing operation in response to said directionally responsive circuit-closing operation and a closed-circuit condition of said receiver-relay, means for causing the transmitter to be in a transmitting condition in response to said sensitive non-directional fault-responsive relaying-means, means for causing said cathode to be disconnected from the negative terminal of said plate-voltage source in response to said directionally responsive circuit-opening operation at a time when said grid is substantially directly connected to the negative terminal of said plate-voltage source, means responsive to the receipt of a predetermined signal-current by said receiver-relay for blocking the change of said receiver-relay to its closed-circuit condition, and means responsive to a response of said directional relaying-means for causing the receiver-relay to change to its closed-circuit condition in the absence of said blocking action.

7. In combination, an oscillating-current generator including a tube-oscillator having a cathode and a grid, a plate-voltage source of supply for said tube-oscillator, and means for interrupting the operation of said generator, comprising a moving-contact switching element connected in the cathode-circuit between said cathode and the negative terminal of said plate-voltage source of supply, and means for actuating said switching element to open-contact position at a time when said grid is substantially directly connected to said negative terminal.

BERNARD E. LENEHAN.
SHIRLEY L. GOLDSBOROUGH.